Sept. 17, 1935.  P. H. DAVEY  2,014,797
MOTOR DRIVEN TRUCK AND APPARATUS CARRIED THEREBY
Filed June 10, 1933
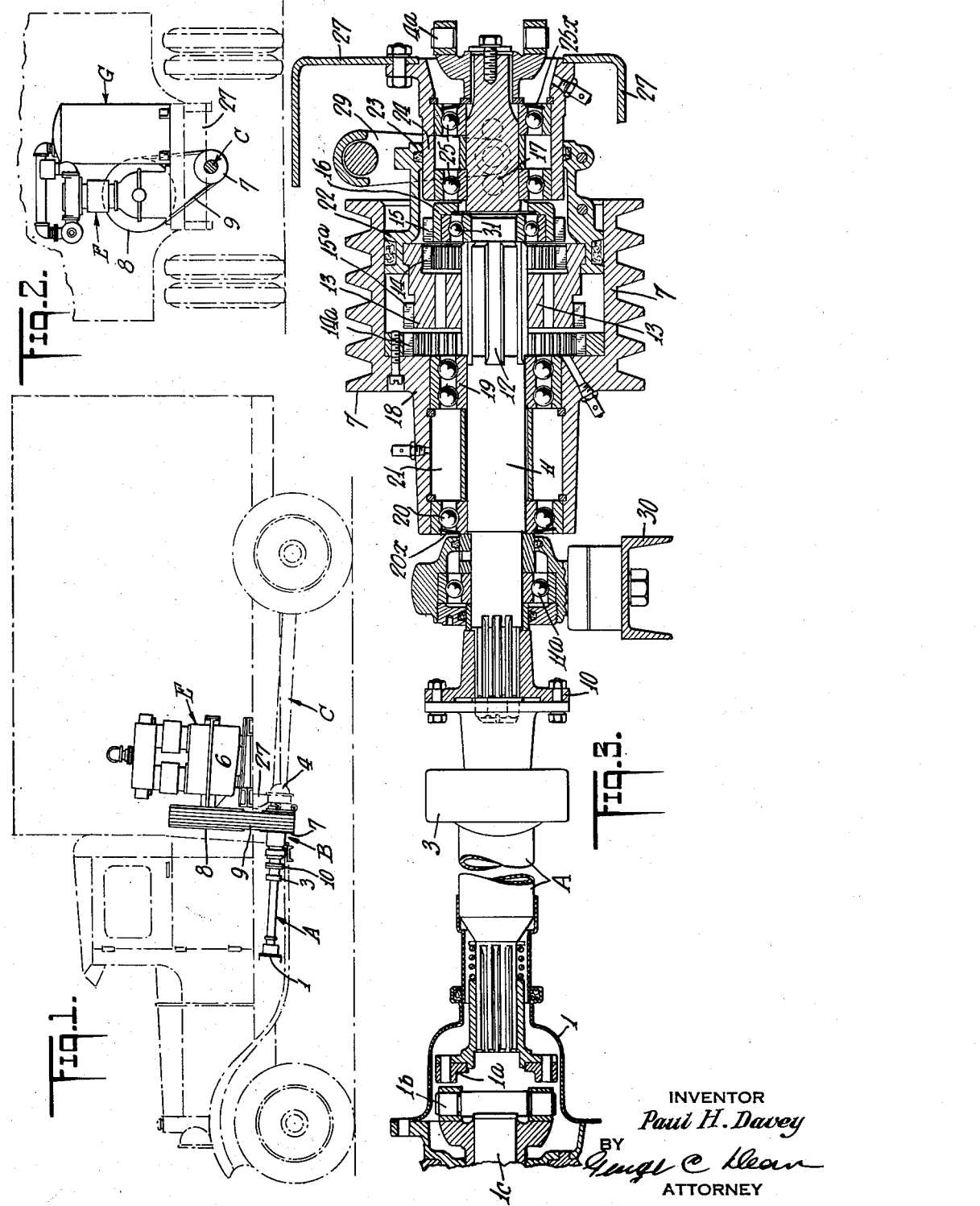
INVENTOR
Paul H. Davey
BY
ATTORNEY Patented Sept. 17, 1935

2,014,797

UNITED STATES PATENT OFFICE 2,014,797

MOTOR DRIVEN TRUCK AND APPARATUS CARRIED THEREBY

Paul H. Davey, Kent, Ohio

Application June 10, 1933, Serial No. 675,152

7 Claims. (Cl. 180—53)

My present invention is shown as embodied in a motor truck carrying an air compressor pump and tank, but relates more particularly to improvements in the power take-off whereby the pump or similar apparatus may be driven by the truck motor.

In the illustrative embodiment here shown the power take-off is designed as a unit adapted to be interposed between the front and rear universals of the propeller shafts of a Ford truck, but the same principles may be applied for use as a power take-off, for other motor driven shafts.

So far as concerns the foregoing, my invention corresponds in some respects to that set forth in patent to Burgess, No. 1,620,946, granted March 15, 1927, but both as to the general combination with the power driven apparatus to be operated through the take off, and the many novel features of internal and external construction, my apparatus is a great improvement.

The principal element of similarity is the employment of the intermediate section in the propeller shaft, with a clutch so designed that the propeller shaft may be connected for driving either the rear axle through the propeller shaft or the equipment on the truck, through the take-off, but the Burgess construction would be entirely unsatisfactory for driving an air compressor and for many other uses, because the power is transmitted through a narrow sprocket chain only; also the friction type of clutch employed would be entirely inadequate for driving an air compressor or other equipment imposing a heavy pulsating load.

Important novel features of my device include the use of the multiple V-belt drive, and this requires a very wide driving sheave. But in most of the standard trucks there is not sufficient space between the rear of the cab and the face of the cross member carrying the universal joint at the forward end of the floating propeller shaft, to accommodate a driving sheave of proper width plus a clutch of proper construction and strength. So one important feature of my invention is locating the clutch inside of the driving sheave. An important feature of the internal clutch is the use of internal and external gears transmitting the power from a central splined shaft, to the interior of the sheave which drives the V-belts.

Building the clutch inside of the driving sheave permits the operating of this driving mechanism in grease, which provides proper lubrication and insures long life as in the ordinary change speed gear boxes of automobiles.

The central splined shaft being large with a shiftable gear splined thereon; and the engagement of internal gears, with external gears of so nearly the same diameter, minimizes back lash, thereby approximating the effect of a spline drive, and the number and size of teeth carrying the load is such as to practically eliminate any chance of breakage or undue wear.

The above and other features of my invention will be more evident from the following description in connection with the accompanying drawing, in which Figs. 1 and 2 are respectively side and rear end elevations showing an automobile truck in dotted lines, my apparatus installed thereon being shown in full lines;

Fig. 3 is a detail view showing on a much larger scale the propeller shaft with my power take-off therein, the operative parts being shown mostly in longitudinal diametric section.

In Figs. 1 and 2, the truck, conventionally indicated in dotted lines, has the usual motor and motor control means, not shown, operating the forward section A of the propeller shaft, intermediate section B, floating section C that drives the axle, air compressor E driven through multiple belts and discharging compressed air into storage tank G.

I is the housing for the end of the shaft that is driven by the shiftable change speed gear connecting it with the crank shaft of the motor. The front section A of the propeller shaft has therein a slightly flexible coupling 3, and terminates in flange coupling 10 bolted to intermediate section B; which terminates in the ordinary universal joint 4, driving the floating propeller shaft section C.

As shown in Fig. 3, the housing I contains the front end of shaft section A, which latter carries one member 1a of a universal joint, the other member 1b being on the end of the driven shaft 1c of the gear shift box (not shown). The part 4a, at the rear end of section B is the forward member of the ordinary universal joint.

Taking the power off the propeller shaft may be accomplished merely by substituting the new section B between the ordinary flange coupling 10 and universal joint 4. The substituted parts are shown in Fig. 3.

In this figure, the intermediate section comprises two shaft sections 11 and 17. Shaft section 11 is rigidly keyed to flange coupling 10, so that normally it is driven continuously by the engine. The rear section 17 carries the rearwardly presented element 4a of the universal 4. The front shaft 11 is guided and supported by a ball bearing assembly 11a, mounted on a cross beam 30 of the truck. The rear section 17, being short, is supported and prevented from tilting by spaced apart sets of ball bearings 25, which are within a tubular support member 24, rigidly bolted to a cross support 27 of the truck. The adjacent ends of shaft sections 11 and 17 are centered in alignment by means of a forwardly projecting hollow element 16 which is rigidly mounted on the forward end of shaft section 17 and contains ball bearings 31 between it and the rear end of shaft section 11. The hollow element 16, has external gear teeth 15 whereby the front and rear sections may be coupled for direct drive, as hereinafter described.

The power take-off is through a wide pulley 7, provided with V grooves for the belts 9, which drive the compressor. This pulley is open at the rear end and it encloses all of the working parts whereby shaft section 11 may be coupled either to drive the truck or the compressor. At the forward end it is closed in by the hub portion 18 and said hub is extended forwardly a substantial distance, preferably about equal to the overhang portion of the pulley. It is mounted on the shaft by means of sets of ball bearings 19, 20, which are spaced apart the full distance permitted by the length of the hub 18, and preferably the rear bearings 19 have two sets of balls since they tend to afford to serve as fulcrums for the overhang stresses that may be applied on the pulley 7. These bearings and spaces 21 between them, may be filled with grease, which may be supplied from the cavity within the pulley 7.

The direct drive for 4a is from flange coupling 10 through shaft section 11, splines 12, and shiftable coupler 13, which is shown in the neutral position. It has internal gear teeth 14 adapted to slide into engagement with teeth 15 formed on the exterior of shell 16, which is keyed to shaft 17. When in mesh, these gear teeth operate as splines or keys.

Shiftable coupler 13 also has external gear teeth, 15a, adapted to be shifted into engagement with the teeth 14a of an internal gear ring on the rearwardly presented inner face of hub 18.

The rear end of pulley 7 is closed in greasetight by slidable collar 22, the rear end of which slides along and rotates upon fixed tubular member which contains ball bearings 25, and shaft 17. The forward end of shaft collar 22 has external packing to prevent escape of grease; and has an internal groove 22a affording swivel engagement with the coupler. The collar 22, 23 is shifted endwise by crank arm 29, to shift coupler 13, optionally; to the left, to drive the pulley through gears 14a, 15a; or to the right, to drive shaft 17 and rear propeller section C, through gears 14, 15.

As to the original standard equipment propeller shaft section between the old forward part of the propeller shaft, A and the old rear part of the propeller shaft C, is in practice only about 1 foot in length, an important space-saving feature of my substitute power take-off section B, is housing the clutch and shift member 13, within the pulley 11a.

The entire cavity between the shaft 11 and the surrounding power take-off rotor, may be closed in grease-tight, as by a spring metal annulus 20x, sprung in place adjacent the forward end of ball bearing 20 and a similar annulus 25x adjacent the rear end of ball bearing 25.

It will be seen that the power to drive the auxiliary apparatus, being derived from the propeller shaft, may have any of the speeds afforded by the usual gear shifts. In the present illustrative case, the power transmitting pulleys 7, 8, and the multiple V-belts 9, are preferably designed for proper operation of a given air compressor 6, when the propeller shaft is on direct drive (high speed connection). Obviously, however, other speeds of the gear shift, may be used, particularly when the power is used for driving other types of apparatus such as hydraulic pumps, winches, etc.

While I have shown and described in great detail, one specific embodiment of my invention, it is to be understood that many variations, modifications and substitutions may be made, within the spirit of my invention, and my claims are not to be considered as limited except to the features specifically defined therein.

I claim:

1. An automotive vehicle provided with a motor and means for connecting it either to propel the vehicle, or to drive other power operated devices, said means including aligned driving and driven propeller shaft sections, the driving section having widely spaced ball bearings carrying a relatively long hub sleeve rigidly supporting a rearwardly extending power take-off sheave, affording annular space adjacent the end of said driving section; double acting positive clutch means in said annular space and non-rotatably splined on said driving section; correlative positive clutch elements, one for the sheave and one for the driven shaft section, and means for shifting said splined clutch means to lock it optionally to said sheave clutch element or to said driven shaft clutch element, the driving shaft section being relatively long and supported from the body of the vehicle by ball bearings and said driven shaft section being supported in fixed alignment by a long bearing sleeve rigidly secured to the frame of the vehicle; and said driven shaft section carrying at its forward end, a hollow bearing member which extends over the rear end of the driving shaft section and is provided with internal ball bearings radially engaging said end.

2. An automotive vehicle provided with a motor and means for connecting it either to propel the vehicle, or to drive other power operated devices, said means including aligned driving and driven propeller shaft sections, and said driven section carrying at its forward end, a hollow bearing member which extends over the rear end of the driving shaft section and is provided with internal ball bearings radially engaging said end, the driving section having widely spaced ball bearings carrying a relatively long hub sleeve rigidly supporting a rearwardly extending power take-off sheave, affording annular space adjacent the end of said driving section; double acting positive clutch means in said annular space and non-rotatably splined on said driving section; correlative positive clutch elements, one for the sheave and one for the driven shaft section, and means for shifting said splined clutch means to lock it optionally to said sheave clutch element or to said driven shaft clutch element, said clutch shifting means including an annular closure slidably engaging the interior of said sheave and the exterior of said stationary bearing of the driven shaft section.

3. An automotive vehicle provided with a motor and means for connecting it either to propel the vehicle, or to drive other power operated devices, said means including aligned driving and driven propeller shaft sections, and said driven section carrying at its forward end, a hollow bearing member which extends over the rear end of the driving shaft section and is provided with internal ball bearings radially engaging said end, the driving section having widely spaced ball bearings carrying a relatively long hub sleeve rigidly supporting a rearwardly extending power take-off sheave, affording annular space adjacent the end of said driving section; double acting positive clutch means in said annular space and non-rotatably splined on said driving section; correlative positive clutch elements, one for the sheave and one for the driven shaft section, and means for shifting said splined clutch means to lock it optionally to said sheave clutch element or to said driven shaft clutch element, said clutch shifting means including an annular closure swiveled to the shiftable clutch member, and slidably engaging the interior of said sheave and the exterior of said stationary bearing of the driven shaft section.

4. An automotive vehicle provided with a motor and means for connecting it either to propel the vehicle, or to drive other power operated devices, said means including aligned driving and driven propeller shaft sections, the driven shaft section terminating rearwardly in a universal joint and held in alignment by spaced apart barr bearings supported by an external sleeve rigidly secured to the frame of the vehicle, said driven shaft section carrying at its forward end a hollow member which extends over and surrounds the rear end of the driving shaft section said hollow member being provided with internal ball bearings radially engaging said rear end of said driving shaft section; and the driving shaft section being supported at a point relatively remote from its rear end by ball bearings which are supported from the body of the vehicle, the driving section carrying a power take-off sheave, rotatably mounted thereon and having its inner surface spaced apart from said driving section to afford an annular space within said sheave; positive clutch means non-rotatably splined on said driving section and housed within said annular space; correlative clutch elements, one for the sheave and one for the adjacent end of the driven section of the propeller shaft, and means for shifting said splined clutch means optionally to lock it to said sheave or to said rear propeller shaft section.

5. An automotive vehicle provided with a motor and means for connecting it either to propel the vehicle, or to drive other power operated devices, said means including aligned driving and driven propeller shaft sections, the driven shaft section terminating rearwardly in a universal joint and held in alignment by spaced apart ball bearings supported by an external sleeve rigidly secured to the frame of the vehicle, said driven shaft section carrying at its driving shaft end a hollow member which extends over and surrounds internal ball bearings radially engaging said rear end of said driving shaft section; and internal ball bearings radially engaging said rear end of the forward section; and the driving shaft section being supported at a point relatively remote from its rear end by ball bearings which are supported from the body of the vehicle, the driving section carrying a power take-off sheave, rotatably mounted thereon; positive clutch means non-rotatably splined on said driving section; correlative clutch elements, one for the sheave and one for the adjacent end of the driven section of the propeller shaft, and means for shifting said splined clutch means optionally to lock it to said sheave or to said rear propeller shaft section.

6. An automotive vehicle provided with a motor and means for connecting it either to propel the vehicle, or to drive other power operated devices, said means including aligned driving and driven propeller shaft sections, said driven shaft section being mounted in a stationary bearing on the vehicle and said driving section having rotatably mounted thereon, a rearwardly extending power take-off sheave, affording an annular cavity adjacent the end of said driving section; double acting clutch means in said annular space and non-rotatably slidable on said driving section; correlative clutch elements, one for the sheave and one for the driven shaft section, and means for shifting said splined clutch means to lock it optionally to said sheave clutch element or to said driven shaft clutch element, said clutch shifting means including an annular closure slidably engaging the interior of said sheave and the exterior of said stationary bearing of the driven shaft section.

7. An automotive vehicle provided with a motor and means for connecting it either to propel the vehicle, or to drive other power operated devices, said means including aligned driving and driven propeller shaft sections, said driven shaft section being mounted in a stationary bearing on the vehicle and said driving section having rotatably mounted thereon, a rearwardly extending power take off sheave, affording an annular cavity adjacent the end of said driving section; double acting clutch means in said annular space and non-rotatably slidable on said driving section; correlative clutch elements, one for the sheave and one for the driven shaft section, and means for shifting said splined clutch means to lock it optionally to said sheave clutch element or to said driven shaft clutch element, said clutch shifting means including an annular closure swiveled to the shiftable clutch member, and slidably engaging the interior of said sheave and the exterior of said stationary bearing of the driven shaft section.

PAUL H. DAVEY.